Patented Apr. 21, 1931

1,801,382

UNITED STATES PATENT OFFICE

RUDOLF WIETZEL, OF LUDWIGSHAFEN-ON-THE-RHINE, AND KURT FISCHER, OF LEUNA, GERMANY, ASSIGNORS, BY MESNE ASSIGNMENTS, TO STANDARD-I. G. COMPANY, OF LINDEN, NEW JERSEY, A CORPORATION OF DELAWARE

PRODUCTION OF HYDROCARBONS

No Drawing. Application filed August 17, 1928, Serial No. 300,381, and in Germany September 30, 1927.

This invention relates to improvements in the manufacture and production of hydrocarbons by treating oxids of carbon with hydrogen or gases rich in hydrogen.

It is already known that various hydrocarbons and other organic compounds can be obtained by treating oxids of carbon with hydrogen, or gases rich in hydrogen such as methane, at an elevated temperature and under suitable pressures, in the presence of catalysts. A large number of catalysts have been proposed, especially activated iron, nickel and cobalt. It is already known that it is advantageous, according to the said process, to add alkalies to the catalysts.

We have now found that, in order to obtain, according to the said process, continuous high yields of hydrocarbons with more than one carbon atom, especially liquid hydrocarbons, it is a matter of decisive importance that the catalysts employed should contain, in addition to a metal of group 8 of the periodic system, in particular a metal of the iron group, a definite quantity of alkali compounds, namely less than about 0.6, and preferably between 0.4 and 0.6 part by weight of alkali, reckoned as alkali metal, per 100 parts by weight of the metal of the 8th group of the periodic system. In order to obtain good yields, it is also essential that the metal should be employed in a finely divided state and not in compact metallic form.

The catalysts may be prepared in a great variety of ways. Ferric oxid, which is completely free from alkali, precipitated, for example, with ammonia, may be employed, the suitable amount of an alkali compound being subsequently added. Again, metals of group 8 may be precipitated by alkalies, and the precipitates washed until the requisite proportion of alkali is contained therein. Moreover, the very finely divided metals, obtained for example by decomposing metal carbonyls, may be activated with suitable amounts of dilute solutions of alkali compounds. The metals of group 8 may be employed singly or mixed together, and also, if desired, in conjunction with other substances such as copper, silver, gold, oxids of the alkaline earths, and the like. The alkali metal compounds may be employed in a great variety of forms, such as hydroxids, carbonates, nitrates, chlorids, ferrocyanids, formates, acetates, oxalates, and the like.

The methods of working already known in the catalytic synthesis of compounds from gases, particularly from carbon monoxid and hydrogen, such for example as working in a cycle, the preliminary purification of the gases, the employment of preliminary catalysts arranged in front of the main catalyst, devices for removing the heat of the reaction, the separation of the reaction products by washing, cooling or with adsorption masses, purifying the circulating gases and the like methods, may also be employed according to the present invention. Furthermore, the portions of the apparatus which become heated during the process and come into contact with the gases, may be constructed of silver, copper, manganese bronze, chromium-nickel, aluminium, iron alloys such as chromium, tungsten or manganese steels, ferrosilicon or the like, or of iron which is provided with a coating adapted to resist the action of the gases and in particular of carbon monoxid.

A great variety of mixtures containing hydrogen, oxids of carbon and the like may be employed as the initial materials, as for example water gas, coke oven gas, coal gas, producer gas, or mixtures of the same, with, if desired, the addition of carbon monoxid, hydrogen or other gases. The relative proportions in which the oxids of carbon on the one hand, and the hydrogen or/and hydrocarbons rich in hydrogen on the other, may exist in the gaseous mixture, may vary considerably. For example, equal volumes of hydrogen and the oxids of carbon may be present in the gases, or the proportions of the oxids of carbon may be higher or lower. In some cases it is specially advantageous to employ gaseous mixtures in which the oxids of carbon constitute less than 25 per cent of the hydrogen and/or hydrocarbons rich in hydrogen present. In this case the reaction proceeds with particular ease.

The temperature employed usually ranges between about 225° and 375° C. and very good results are obtained at temperatures of between about 260° and 280° C.

The pressure to be applied may vary within wide limits, and therefore the work may be conducted at ordinary pressure, medium pressures, say about 20 or 50 atmospheres, and also very high pressures such as 100 to 200 or even 1000 atmospheres and more. The reaction space may be smaller in proportion as the pressure is higher. The deposition of the reaction products occurs with particular ease at elevated pressures. Generally speaking the composition of the reaction product varies according to the catalyst employed in each case. When the content of the catalyst in alkali is low, the low boiling hydrocarbons preponderate, whilst with a higher limit of alkali content there is generally an increased tendency to the formation of higher molecular products. In some cases the formation of hydrocarbons is accompanied by the formation of oxygen compounds, such for example as substances of wax character, acids of high molecular weight, alcohols and the like. If the alkali content is below about 0.03 part by weight of alkali metal per 100 parts of metal of group 8 of the periodic system, the yields are lower. If the alkali content exceeds the limit of about 0.6 part by weight of alkali metal per 100 parts by weight of metal of group 8, the catalyst readily becomes inactive owing to the deposition of solid products on its surface.

The following examples will further illustrate the nature of the said invention which however is not limited thereto.

*Example 1*

A mixed hydroxid, precipitated with ammonia and containing iron and cobalt in the relative proportions of 4 to 1, is decanted several times, filtered by suction and washed. When dry, the mixture is impregnated with a solution of potassium hydroxid, so as to contain 0.14 part by weight of potassium per 100 parts by weight of the iron metals.

The resulting catalyst is again dried and is then charged into the reaction vessel. With a single passage of 1 cubic meter of a gas containing 25 per cent of CO, 70 per cent of $H_2$, 4 per cent of $N_2$, and 1 per cent of methane, at 250° C. and under a pressure of 150 atmospheres, 10 cubic centimeters of the catalyst furnish 20 cubic centimeters of hydrocarbons (benzine) which are liquid at ordinary temperature. Moreover, by cooling to about 10° C. below zero, 25 cubic centimeters of liquid hydrocarbons (liquid at ordinary temperature) containing more than 1 carbon atom, can be recovered. A similar effect is produced by a catalyst containing 10 parts of palladium and 0.1 part of potassium per 100 parts of iron.

*Example 2*

A mixture, precipitated with potassium hydroxid or potassium carbonate and containing iron, cobalt and uranium in the proportions 4:2:1, is repeatedly decanted and washed with distilled water until its alkali content amounts to 0.17 part by weight of potassium per 100 parts by weight of the metals of group 8. The mixture is dried at 200° C.

100 cubic centimeters of the catalyst prepared in this manner furnish, by a single passage of 1 cubic meter of a gas containing about 35 per cent of CO and 65 per cent of $H_2$, at a reaction temperature of 270° C. and under atmospheric pressure, 27 cubic centimeters of benzine and 5 cubic centimeters of liquefied gaseous hydrocarbons.

In the preparation of the catalyst, the decrease of the alkali content in washing is continuously supervised by drying and analyzing samples. If the alkali content of the catalyst amounts to only 0.2 part by weight of potassium, per 100 parts by weight of metals of group 8, the yield of benzine is only small, whilst with an excessive content of alkali, such as 1.5 parts by weight of potassium per 100 parts by weight of metals of group 8, the yield of benzine hydrocarbons diminishes in favor of higher molecular products. Moreover, the surface of the catalyst becomes coated with solid substances and the catalyst therefore soon becomes inactive. Similar effects are obtained with the following catalysts.

200 parts of iron, 10 parts of cobalt and 0.2 part of potassium, or 40 parts of iron, 20 parts of cobalt, 10 parts of nickel and 0.34 part of sodium, or 50 parts of iron, 10 parts of cobalt, 10 parts of vanadium and 0.2 part of potassium.

*Example 3*

A mixture of oxids or carbonates, precipitated with caustic alkalies or alkali carbonates and containing iron, cobalt and silver in the proportions 4:2:1 by weight, is decanted with distilled water as often as possible, well washed, and dried at 200° C. The product is then finely granulated and is repeatedly well extracted by boiling with distilled water, during several hours. It is again dried at 200° C. and is impregnated with a solution of sufficient potassium carbonate to bring its alkali content to 0.16 part by weight of potassium per 100 parts by weight of metals of the iron group. With a single passage of 1 cubic meter of a gas containing about 25 per cent of CO and about 70 per cent of $H_2$, 4 per cent of $N_2$ and 1 per cent of methane, at about 290° C. and under a pressure of 50 atmospheres, 30 cubic centimeters of the above catalyst furnish 24 cubic centimeters of benzine and 18 cubic centimeters of liquefied hydrocarbon gases.

Example 4

A mixture of alkali free, freshly precipitated hydroxids of iron, cobalt and barium, containing the said metals in the proportions of 100:10:1 by weight, is intimately stirred with a solution of sufficient rubidium hydroxid to introduce 0.18 part by weight of rubidium per 100 parts by weight of the metals of group 8. If the resulting catalyst be employed under the conditions specified in Example 3, but at about 275° C. a single passage of the gaseous mixture furnishes 3 grams of a body resembling paraffin wax, 17 cubic centimeters of benzine and 5 cubic centimeters of liquefied hydrocarbon gases.

Example 5

The hydroxids of iron and copper, freed from alkali, are intimately mixed in the proportions of 5 gram atoms of iron to 3 gram atoms of copper, the mixture being then dried and impregnated with such a quantity of a solution of potassium hydroxid that the dry catalyst contains 0.51 part by weight of potassium per 100 parts by weight of iron. With a single passage of 1 cubic meter of gas containing about 25 per cent of CO and 75 per cent of $H_2$, under a pressure of about 5 atmospheres and a reaction temperature of about 260° C., 150 cubic centimeters of the above catalyst furnish about 50 cubic centimeters of hydrocarbons with more than 1 carbon atom which are liquid at ordinary temperature, and 5 cubic centimeters of hydrocarbons with more than 1 carbon atom to be liquefied at low temperature.

Example 6

The wet mixture of the hydroxids of iron and cobalt precipitated with ammonia and containing the said metals in the proportions of 4 gram atoms of iron to 1 gram atom of cobalt, is well decanted, filtered by suction, washed, and dried at 150° to 200° C. The highly porous product is impregnated with a sufficient amount of a solution of sodium carbonate for it to contain, when re-dried, 0.44 part by weight of sodium per 100 parts by weight of metals of group 8. With a single passage of 1 cubic meter of gas containing about 25 per cent of CO and 75 per cent of $H_2$, at 270° C. and under ordinary pressure, 200 cubic centimeters of this catalyst furnish 38 cubic centimeters of hydrocarbons liquid at ordinary temperature, and 1.2 liters of gaseous hydrocarbons, both products containing more than 1 atom of carbon in the molecule.

What we claim is:—

1. In the production of hydrocarbons with more than one carbon atom in the molecule, by treating oxids of carbon with a gas comprising hydrogen, the step of carrying out the said treatment in the presence of a catalyst containing in addition to a metal of group 8 of the periodic system a quantity of an alkali metal compound equivalent to less than about 0.6 part by weight of alkali reckoned as alkali metal per 100 parts by weight of the metal of the 8th group of the periodic system.

2. In the production of hydrocarbons with more than one carbon atom in the molecule, by treating oxids of carbon with a gas comprising hydrogen, the step of carrying out the said treatment in the presence of a catalyst containing in addition to a metal of group 8 of the periodic system a quantity of an alkali metal equivalent to from 0.4 to 0.6 part by weight of alkali reckoned as alkali metal per 100 parts by weight of the metal of the 8th group of the periodic system.

3. In the production of hydrocarbons with more than one carbon atom in the molecule, by treating oxids of carbon with a gas comprising hydrogen at temperatures ranging between about 225° and 375° C., the step of carrying out the said treatment in the presence of a catalyst containing in addition to a metal of group 8 of the periodic system a quantity of an alkali metal compound equivalent to less than about 0.6 part by weight of alkali reckoned as alkali metal per 100 parts by weight of the metal of the 8th group of the periodic system.

4. In the production of hydrocarbons with more than one carbon atom in the molecule, by treating oxids of carbon with a gas comprising hydrogen at temperatures ranging between about 225° and 375° C., the step of carrying out the said treatment in the presence of a catalyst containing in addition to a metal of group 8 of the periodic system a quantity of an alkali metal compound equivalent to from 0.4 to 0.6 part by weight of alkali reckoned as alkali metal per 100 parts by weight of the metal of the 8th group of the periodic system.

5. In the production of hydrocarbons with more than one carbon atom in the molecule, by treating oxids of carbon with a gas comprising hydrogen, the step of carrying out the said treatment in the presence of a catalyst containing a metal of the iron group and a quantity of an alkali metal compound equivalent to less than about 0.6 part by weight of alkali reckoned as alkali metal per 100 parts by weight of the metal of the iron group.

6. In the production of hydrocarbons with more than one carbon atom in the molecule, by treating oxids of carbon with a gas comprising hydrogen, the step of carrying out the said treatment in the presence of a catalyst containing a metal of the iron group and a quantity of alkali equivalent to from 0.4 to 0.6 part by weight of alkali reckoned as alkali metal per 100 parts by weight of metal of the iron group.

7. In the production of hydrocarbons with more than one carbon atom in the molecule, by treating oxids of carbon with a gas comprising hydrogen at temperatures ranging between about 225° and 375° C., the step of carrying out the said treatment in the presence of a catalyst containing a metal of the iron group and a quantity of alkali equivalent to from 0.4 to 0.6 part by weight of alkali reckoned as alkali metal per 100 parts by weight of metal of the iron group.

8. In the production of hydrocarbons with more than one carbon atom in the molecule, by treating oxids of carbon with a gas comprising hydrogen at temperatures ranging between about 225° and 375° C., the step of carrying out the said treatment in the presence of a catalyst containing a mixture of iron and cobalt and a quantity of alkali equivalent to from 0.4 to 0.6 part by weight of alkali reckoned as alkali metal per 100 parts by weight of the said metals of the iron group.

9. A process for the production of hydrocarbons with more than one carbon atom in the molecule, which comprises treating a mixture containing about 25 per cent of carbon monoxid and 75 per cent of hydrogen at about 270° C. with a catalyst containing iron and cobalt in the proportions of about 4 gram atoms of iron to 1 gram atom of cobalt and 0.44 part of a sodium compound reckoned as sodium per 100 parts of metals from the iron group.

10. In the production of liquid hydrocarbons by treating oxides of carbon with hydrogen at temperatures ranging between 225° and 375° C., the step of carrying out the said treatment in the presence of a catalyst containing in addition to a metal of group 8 of the periodic system a quantity of an alkali metal compound equivalent to from 0.4 to 0.6 part by weight of alkali reckoned as alkali metal per 100 parts by weight of the metal of the 8th group of the periodic system.

11. In the production of liquid hydrocarbons by treating oxides of carbon with hydrogen at temperatures ranging between about 225° and 375° C., the step of carrying out the said treatment in the presence of a catalyst containing a metal of the iron group and a quantity of alkali equivalent to from 0.4 to 0.6 part by weight of alkali reckoned as alkali metal per 100 parts by weight of metal of the iron group.

12. In the production of liquid hydrocarbons by treating oxides of carbon with hydrogen at temperatures ranging between about 225° and 375° C., the step of carrying out the said treatment in the presence of a catalyst containing a mixture of iron and cobalt and a quantity of alkali equivalent to from 0.4 to 0.6 part by weight of alkali reckoned as alkali metal per 100 parts by weight of the said metals of the iron group.

In testimony whereof we have hereunto set our hands.

RUDOLF WIETZEL.
KURT FISCHER.